UNITED STATES PATENT OFFICE.

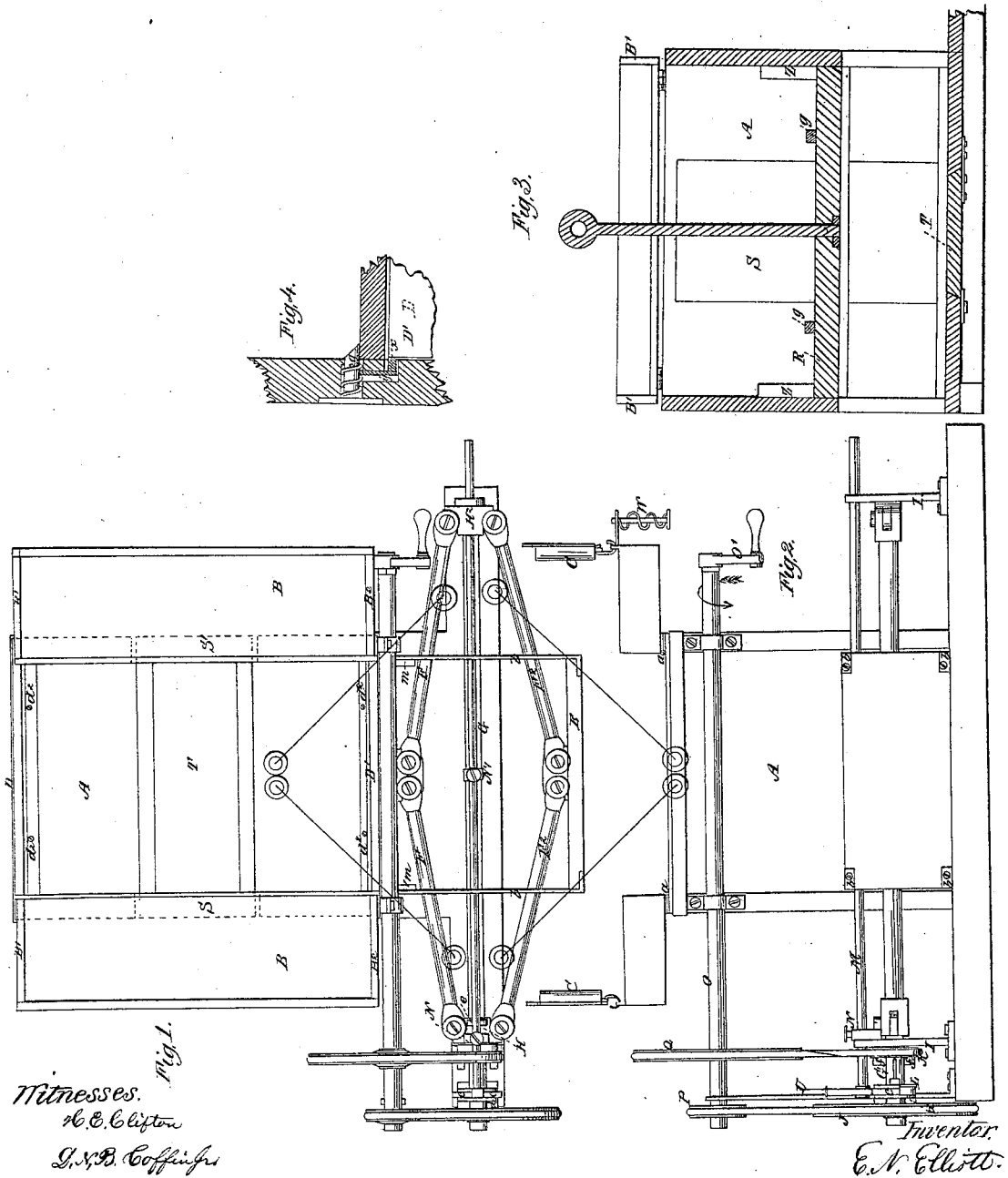

E. N. ELLIOTT, OF PORT GIBSON, MISSISSIPPI.

IMPROVEMENT IN COTTON-PRESSES.

Specification forming part of Letters Patent No. 26,174, dated November 22, 1859.

*To all whom it may concern:*

Be it known that I, E. N. ELLIOTT, of Port Gibson, in the county of Claiborn and State of Mississippi, have invented a new and useful Improvement in Cotton-Presses; and I do hereby declare that the following is a full and exact description of the same, reference being had to the accompanying drawings, and to the letters of reference marked thereon, making part of this specification.

The nature of my invention relates, first, to the employment of hinged forms in combination with a weighted follower, so arranged as to serve as guides to said follower, and also to facilitate the deposit of cotton into the box or flume of the press; second, to the employment of the weighted follower in connection with the spring-bolts; third, to the arrangement of the doors in relation to the box and the bale therein when fully compressed; fourth, to the employment of the guides upon the follower; fifth, to the arrangement of parts in the device for stopping the operation of the screw and preventing its accidental starting, the whole being constructed, arranged, and operating substantially as hereinafter set forth and represented.

With reference to the accompanying drawings, Figure 1 is a plan; Fig. 2, an end elevation; Fig. 3, a sectional elevation; Fig. 4, a sectional elevation showing the spring-bolts.

The box or flume is designated by the letter A, and is open at the top, where are hinged on either side the platforms B, which are furnished with the rims B', which rims serve to prevent the cotton laid upon the forms from sliding off, and also as guides to the follower R when the forms are turned upright. The outer edges of these forms are supported by the spring-balance C or W, or other weighing device to indicate the quantity of cotton laid upon the forms. When sufficient quantity of cotton to make a bale is indicated by the balances C, the forms B are turned upright, and so depositing the cotton in the box serve also as guides for follower R, to cause it to pass down freely into the box. In the bottom of the box are arranged the two followers D D', one of the followers, D, being fast to the rods $b$, the opposite ends of rods $b$ being fast to head E. Follower D' is jointed to the two toggle-arms F, the two other corresponding arms, F', being jointed to the head E. The opposite ends of these arms F' are jointed to the traversing nuts H H' on screw G. These nuts, as they are drawn toward each other by the operation of the screw G, cause the arms F F' to throw in opposite directions the head E and follower D', as indicated by the red lines in the drawings, so that the follower D, being connected to head E by the rods $b$, is made to approach follower D', and follower D', jointed to the arms F, is made at the same time to move in the opposite direction toward the follower D, so compressing the cotton placed between them. The screw G has bearings in the stands I. On the shank of this screw is arranged and fitted so as to turn freely the large pulley J and the small pulley K, with sufficient space for the clutch L to stand between them without being in connection with either. The clutch L slides freely on the screw-shank G' between the pulleys J and K, on both of which are suitable lugs, $f\ d$, for the clutch to connect with, so as to drive them when the clutch is in connection. The clutch L is prevented from turning upon the screw-shank G' by being fitted with a spline, so as to receive and slide freely upon a feather fixed in the screw-shank. Above the screw is arranged the rod M, so as to slide freely lengthwise and in a line with the screw G, and having its bearings in stands I. On the end of this sliding rod M is arranged and secured the shipping-fork $c$, operating in a groove in clutch L, and having the handle U, by which the operator can throw the clutch into connection with either pulley at the proper time.

On the rod M are so adjusted the stops N' N that when the traversing nuts H and H' approach the outward limit of their movement, and the followers D and D' are consequently at the extreme ends of the box, the spur $e$ on nut H comes in contact with and so moves stop N, rod M, and fork $c$ as to disconnect the clutch L from the pulley K, and so stop the operation of the screw. The spur $e$ will then prevent, by standing in the way of stop N, the clutch from being thrown back into connection with the pulley K until it has first been put in connection with the pulley J, to drive the screw in the opposite direction. When the nuts H H' approach the inner limit of their movement, the spur $e$ comes in contact with and so moves stop N', rod M, and the fork c as to disconnect the clutch L from the pulley J, and stop the operation of the screw in that direction, the followers D and D' having at this point fully compressed the cotton between them to the proper limit. O is the driving-shaft to which power is applied to drive the press. Upon it are fitted and secured the pulleys P and Q. A belt passing around pulleys P and J communicates to the screw G the proper slow and powerful motion for pressing whenever the clutch L is put in connection with pulley J, the pulley K meanwhile running freely upon the shank G', and in like manner a belt passes around pulleys Q and K, but, being a crossed belt, causes a reversed motion with greater speed, suitable for running the followers back.

The follower or plunger R is made to operate vertically in the box, and is fitted to pass down freely within it, and is suitably weighted, so that, being let fall from its point of suspension above the cotton and between the forms B turned upright, it will by its own weight and momentum press down the cotton to the requisite thickness for the bale, at which point there are arranged the spring-bolts $g$, which are pressed back by the downward movement of plunger R, its edges acting upon their inclined ends, but shoot out by the recoil of their springs immediately when the plunger is past them, and hold it securely down until in the pressing operation the followers D D' have about completed their movement. The spring-bolts $g$ are provided with the finger Y, and the followers D D' have secured to their upper corners the projecting arm X, having a beveled or rounded end, so that when the compressing movement of the followers D D' is about completed the arms X come in contact with the fingers Y, and so by their beveled ends press back the fingers Y, and therewith the bolts $g$, so simultaneously releasing the follower from them all. The follower R has secured to its four corners the guides Z, by which it is kept in a level position as it moves up and down, these guides moving along in the corners of the box and of the forms B when turned upright.

The doors S S' are arranged in the two sides of the box A at the center, where the bale of cotton rests when fully compressed; also at the same point is arranged the door T in the bottom. These doors S, S', and T are opened from the outside and furnish access to the bale after it is compressed, so as to allow the covering for the two ends and the top and bottom to be wrapped around in one piece, the ends of this one piece meeting on top of the bale, so as to be covered and held by one of the bands without sewing. The covering for the two sides of the bale is put upon the followers D D' before the cotton is put into the press, so that the bands being passed around the bale through the vertical grooves seen in the followers D and D' and made fast—one of them over the joint of the long piece covering two ends and two sides, as described—the whole covering of the bale is effectually secured by the bands simply without the aid of sewing at all. Follower D' is furnished with guides $m$, like those on plunger R.

Having thus set forth the construction of my improvement, I will proceed to describe the operation thereof, which is as follows: The shaft O being first set in motion in the direction indicated by the arrow in Fig. 2 by any suitable power through the crank O' or otherwise, and the followers D D' drawn back to the position shown in the drawings—viz., at the extreme ends of the box A—and the follower R suspended by any suitable arrangement directly over the box A in such position as to be inclosed by the forms B when they are turned upright, the cotton is then laid upon the forms B until a sufficient quantity for a bale is indicated by the balance C, the covering for the two sides of the bale being meanwhile arranged upon the followers D D' by means of points $d^2$ in their top edge. Then the forms B are turned upright, so depositing the cotton in the box and inclosing the follower R above it, which follower R is now let fall, so compressing the cotton to the proper depth and holding it there by the aid of spring-bolts $g$, as described. The clutch L is now thrown into connection with pulley J, as described, so giving motion to screw G, causing followers D D' to approach each other and so compress the cotton to the proper size, as described, near which point in the operation the arms X on the followers D D' come in contact with the finger Y on spring-bolts $g$, so as to release them simultaneously, and at the same time the spur $e$ comes in contact with stop N', disconnecting clutch L from pulley J, as described, so stopping the operation of the screw G. Follower R is now raised up by any suitable arrangement for the purpose, and meanwhile the doors S, S', and T being thrown open, the covering for the two ends and top and bottom of the bale is passed around it, the rods $b$ being arranged in the sides of the box deeply enough to allow it to pass between them and the bale, and meeting its two ends on the top or bottom. One of the bands which are to secure the bale is arranged over the joint, and the rest with it, secured as usual, the entire covering for the bale being thus secured by the bands alone without the aid of sewing at all, as before described, after which the bale is taken out at the bottom. Meanwhile, the forms B having been filled, as before, the operation is repeated continuously, the followers D D' also having first been run back, as described, after the covering and bands are applied to the bale.

I do not claim the forms B when taken separately and irrespective of the box A and follower R. Neither do I claim any device for weighing the cotton; but, Having described the construction and operation of my invention, what I do claim as new, of my own invention, and desire to secure by Letters Patent, is—

1. The employment of the hinged forms B, (forming part of the box A,) in combination with the follower R, said forms being so arranged as to receive the cotton and to act as guides for the follower, substantially as described.

2. The employment of the weighted follower R, in connection with the spring-bolts $g$ or their equivalent, whereby the loose cotton is instantly at the proper time brought down and held in the proper space to be acted upon by the followers F, substantially as described.

3. The arrangement of the doors S, S', and T with reference to the box A and the position of the bale therein when fully compressed, by means of which I am enabled to apply and secure the covering without sewing, substantially as described.

4. The arrangement of the rod M and stops N N² with reference to nut H and its movement, whereby the clutch L is not only disconnected from the pulleys J and K at the proper times, but also prevented from connecting by accident or otherwise, as described.

In testimony of which invention I have hereunto set my hand.

E. N. ELLIOTT.

Witnesses:
H. E. CLIFTON,
D. N. B. COFFIN, Jr.